(12) United States Patent
McKay et al.

(10) Patent No.: US 11,568,738 B2
(45) Date of Patent: *Jan. 31, 2023

(54) COMMUNICATING DISCOVERY INFORMATION FROM REMOTE CONTROL DEVICES

(71) Applicant: Universal Electronics Inc., Santa Ana, CA (US)

(72) Inventors: Dan M. McKay, San Jose, CA (US); Raymond O. Chock, San Jose, CA (US)

(73) Assignee: Universal Electronics Inc., Santa Ana, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/731,507

(22) Filed: Dec. 31, 2019

(65) Prior Publication Data
US 2020/0135013 A1 Apr. 30, 2020

Related U.S. Application Data

(60) Continuation of application No. 15/452,331, filed on Mar. 7, 2017, now Pat. No. 10,553,107, which is a division of application No. 12/070,686, filed on Feb. 20, 2008, now Pat. No. 9,626,864.

(51) Int. Cl.
G08C 23/04 (2006.01)
G08C 19/28 (2006.01)
H04N 7/14 (2006.01)

(52) U.S. Cl.
CPC ............ *G08C 23/04* (2013.01); *G08C 19/28* (2013.01); *H04N 7/142* (2013.01)

(58) Field of Classification Search
USPC .............. 340/12.22–12.55; 348/14.05, 734; 341/176; 334/8; 455/151.1–153.2
See application file for complete search history.

(56) References Cited

U.S. PATENT DOCUMENTS

| 5,583,491 A * | 12/1996 | Kim ................... H04N 5/44582 340/13.31 |
| 7,154,566 B2 | 12/2006 | Gustafson et al. |
| 7,429,932 B1 | 9/2008 | Newell et al. |
| 7,492,278 B2 | 2/2009 | Zigmond et al. |

(Continued)

FOREIGN PATENT DOCUMENTS

WO 9800933 A1 1/1998

OTHER PUBLICATIONS

U.S. Patent and Trademark Office, Non-Final Office Action issued in U.S. Appl. No. 16/813,233, dated Nov. 27, 2020, 22 pgs.

(Continued)

*Primary Examiner* — Curtis A Kuntz
*Assistant Examiner* — Jerold B Murphy
(74) *Attorney, Agent, or Firm* — Greenberg Traurig, LLP

(57) ABSTRACT

A set top box receives from a remote control device one or more of a codeset identifier, data indicative of a brand and model for a consumer electronic device, and remote control diagnostic information. The set top box then causes information representative of the received codeset identifier, data indicative of a brand and model for a consumer electronic device, and remote control diagnostic information to be displayed in a display device associated with the set top box.

14 Claims, 4 Drawing Sheets

(56) References Cited

U.S. PATENT DOCUMENTS

| | | |
|---|---|---|
| 7,589,642 B1 | 9/2009 | Mui |
| 7,671,758 B1 * | 3/2010 | Seidel .................. G11B 27/005 |
| | | 340/12.28 |
| 9,626,864 B1 * | 4/2017 | McKay .................. G08C 23/04 |
| 10,553,107 B2 * | 2/2020 | McKay .................. G08C 23/04 |
| 2005/0078226 A1 | 4/2005 | Matoba |
| 2007/0052547 A1 | 3/2007 | Haughawout et al. |

OTHER PUBLICATIONS

U.S. Patent and Trademark Office, Final Office Action issued in U.S. Appl. No. 16/813,233, dated Apr. 7, 2021, 24 pgs.

U.S. Patent and Trademark Office, Non-Final Office Action issued in U.S. Appl. No. 16/813,233, dated Mar. 15, 2022, 16 pgs.

\* cited by examiner

COMMUNICATING DISCOVERY INFORMATION FROM REMOTE CONTROL DEVICES

RELATED APPLICATION INFORMATION

This application is a continuation of and claims the benefit of U.S. application Ser. No. 15/452,331, filed on Mar. 7, 2017, which application is a divisional of and claims the benefit of U.S. application Ser. No. 12/070,686, filed on Feb. 20, 2008, the disclosures of which are incorporated herein by reference in their entirety.

TECHNICAL FIELD

The disclosed embodiments relate to remote control devices, more specifically, to a method of communicating discovery information from remote control devices.

BACKGROUND

Remote control devices transmit operational signals to control electronic consumer devices such as TVs, VCRs, set-top boxes, audio home theatre systems, and CD/DVD players. Each operational signal communicates a keycode associated with a selected electronic consumer device. Each keycode corresponds to a function of the selected electronic consumer device, such as power on, power off, volume up, volume down, play, stop, select, channel up, channel down, etc. A particular brand and make of electronic consumer device responds to operational signals. Each operational signal encodes a keycode. The electronic consumer device receives the operational signal, decodes the keycode, and in response performs a corresponding function. The set of keycodes (as well as associated system codes, protocol information and/or formatting information) for generating operational signals for a particular electronic consumer device is referred to here as a codeset.

A remote control device uses a particular codeset to control a corresponding electronic consumer device. A universal remote control (URC) device, on the other hand, generally stores hundreds of codesets in a codeset database and can be programmed to use a particular codeset among the codeset database to control a corresponding electronic consumer device.

There are many codesets used in the market. Each codeset is identified by a codeset identifier. Because of the large number of different electronic consumer devices and corresponding codesets, it is difficult to discover the codeset identifier that is used by a particular remote control device. It is also difficult to program a universal remote control device that is capable of controlling a very large number of different electronic consumer devices.

SUMMARY

A method involves communicating remote control discovery information from a remote control device to a receiver. The remote control device is used to control a particular electronic consumer device. The remote control discovery information may, for example, include: a codeset identifier that identifies a codeset stored in the remote control device, device information, diagnostic information, and/or marketing information. The device information may include a device description, and/or device characteristics information that correspond to the electronic consumer device. The remote control discovery information is transmitted from the remote control device to the receiver as part of a wireless communication.

In one novel aspect, a system includes a remote control device and a receiver. The remote control device is operable in both a normal operational mode and a discovery mode. In the normal operational mode, the remote control device transmits operational signals to control a particular electronic consumer device. In the discovery mode, the remote control device transmits remote control discovery information to the receiver. By transmitting the remote control discovery information from the remote control device, the remote control device and the corresponding electronic consumer device can be easily identified. In addition, the remote control discovery information can be easily collected and used for diagnostic and marketing purposes.

In one example, the receiver is a set-top box. The set-top box is connected to an online central database through a network. Upon receiving the remote control discovery information, the set-top box processes the discovery information and responds accordingly. In one example, the receiver receives a codeset identifier and in response displays the codeset identifier on a display screen. In another example, the receiver receives a codeset identifier and in response retrieves a codeset corresponding to the codeset identifier from the online central database. In addition, the receiver loads the retrieved codeset onto a universal remote control device such that the universal remote control device can control the electronic consumer device.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
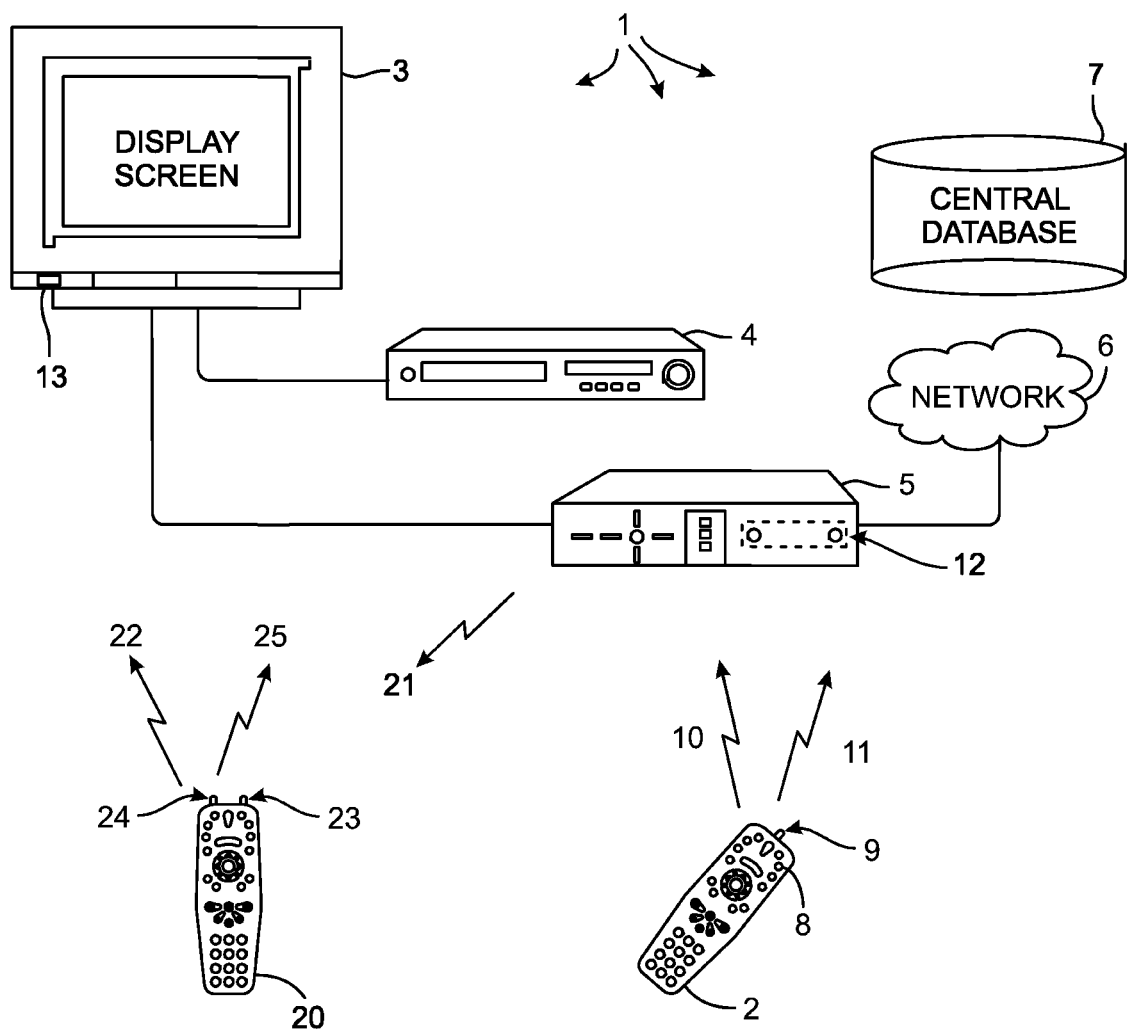
FIG. 1 illustrates a system in accordance with one novel aspect.

FIG. 1 is a diagram of a system 1 in accordance with one novel aspect. System 1 includes a remote control device 2, a television (TV) 3, a VCR/DVD player 4, a set-top box 5, a network 6, an online central database 7, and a universal remote control device 20. Remote control device 2 includes a key 8, a light emitting diode (LED) 9. In one novel aspect, remote control device 2 is operable in both a normal operational mode and a discovery mode. Typically, a user uses remote control device 2 to control a selected electronic consumer device such as TV 3 in the normal operational mode. The user may press key 8 on remote control device 2 to turn on/off the power of TV 3. When the user presses key 8, remote control 2 emits an operational signal (for instance, an infrared signal) 10 from LED 9. Operational signal 10 is transmitted to an infrared receiver 13 of TV 3. Infrared receiver 13 receives operational signal 10, and recovers the keycode and takes appropriate action, which in this case is to turn on or turn off TV 3.

As illustrated in FIG. 1, remote control 2 transmits remote control discovery information 11 when remote control device 2 is in the discovery mode. In one example, a user presses a predefined sequence of keys on remote control device 2 such that remote control device 2 enters into the discovery mode. Remote control device 2 then transmits remote control discovery information 11 to receiver 12. Remote control device 2 exits the discovery mode and returns back to the normal operational mode after the remote control discovery information 11 is transmitted. In the example of FIG. 1, receiver 12 is a part of set-top box 5. After set-top box 5 receives the remote control discovery information 11, set-top box 5 interprets and processes the remote control discovery information accordingly.

Figure 2:
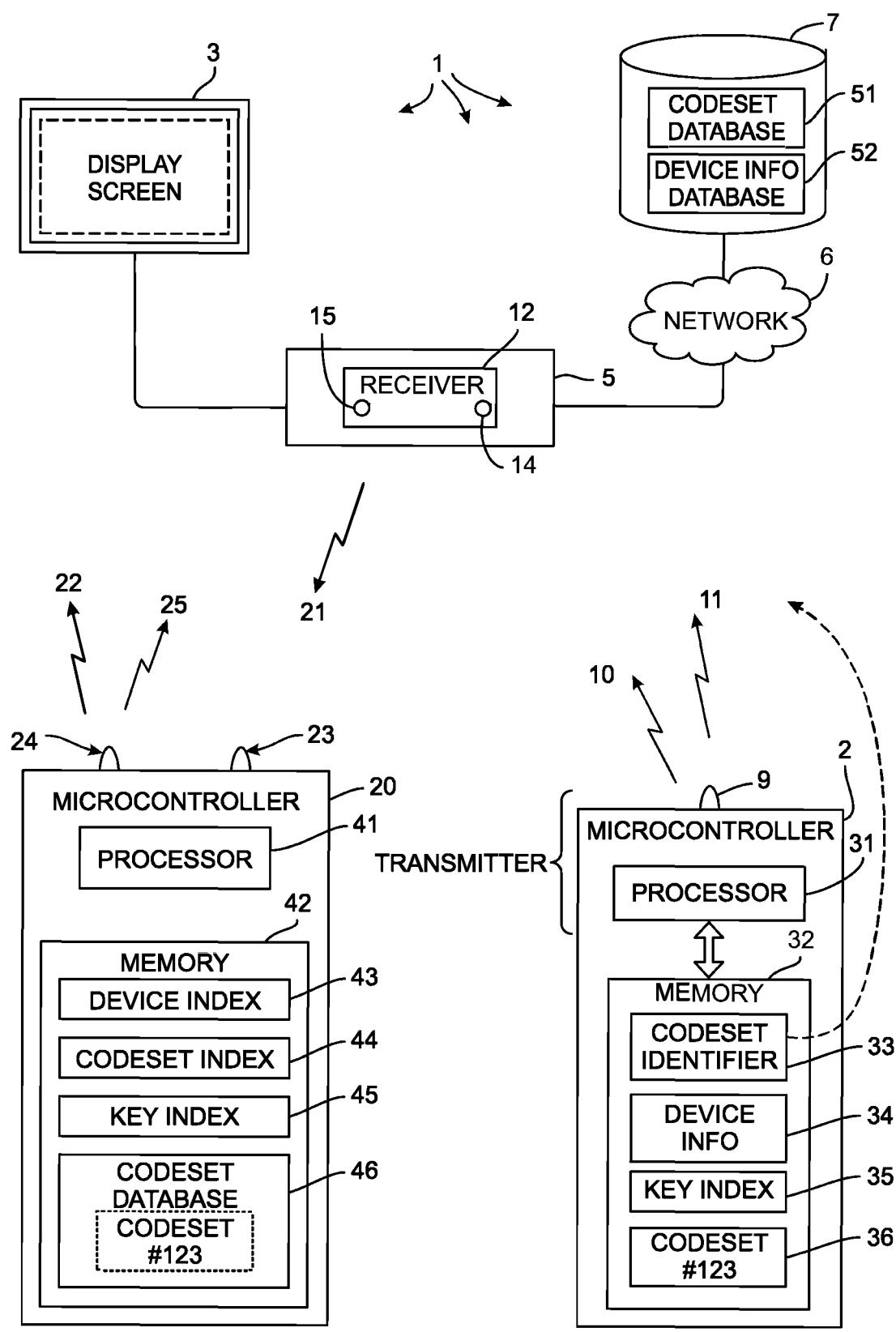
FIG. 2 is a simplified block diagram of the system in FIG. 1.

FIG. 2 is a simplified block diagram of the system in FIG. 1. As illustrated in FIG. 2, remote control device 2 includes a processor 31 and a memory 32. Memory 32 includes a codeset identifier 33, device information 34, a key index table 35, and a codeset #123 36 that is used to control TV 3. Universal remote control device 20 includes a processor 41 and a memory 42. Memory 42 includes a device index table 43, a codeset index table 44, a key index table 45, and a codeset database 46. Online central database 7 includes a codeset database 51 and a device information database 52. In the example of FIG. 2, receiver 12 is a part of set-top box 5 and is capable of receiving and transmitting operational signals such as infrared signals. Receiver 12 includes an IR receiver 14 and an IR transmitter 15.

When remote control device 2 is in its discovery mode, remote control device 2 transmits the remote control discovery information 11 to receiver 12. In the presently described embodiment, the remote control discovery information 11 includes a unique codeset identifier 33 that is stored in memory 32 of remote control device 2. In one example, remote control device 2 uses codeset #123 to control TV 3 (for instance, a TOSHIBA TV with model number 42L×177), and codeset identifier 33 is a three digit number (for instance, number 123 as illustrated in FIG. 2) that identifies codeset #123. When receiver 12 receives codeset identifier 33, the three digit number 123 is displayed on a display screen of TV 3 that is connected to receiver 12. Alternatively, the three digit number 123 is forwarded to online central database 7. Therefore, by transmitting codeset identifier 33 from remote control device 2, it can be easily discovered that codeset #123 is used by remote control device 2 to control a TOSHIBA television with model number 42L×177.

The transmitted codeset identifier 33 can also be used by a user to program a universal remote control device 20 to control TV 3. If codeset #123 is already stored in codeset database 46 of universal remote control device 20, then the user simply programs universal remote control 20 to use codeset #123 by entering the three digit number 123 displayed on the display screen of TV 3. If, however, codeset #123 is not stored in codeset database 46 of universal remote control 20, then receiver 12 retrieves the actual codeset #123 from codeset database 51 of online central database 7 through network 6. In addition, receiver 12 transmits an operational signal 21 that includes the actual codeset #123. In the example of FIG. 2, universal remote control device 20 is a two-way remote control device which includes an IR receiver 23 and an IR transmitter 24. When operational signal 21 is received by IR receiver 23, universal remote control device 20 recovers codeset #123 and loads codeset #123 into its codeset database 46 and programs itself to use codeset #123 to control TV 3.

Figure 3:
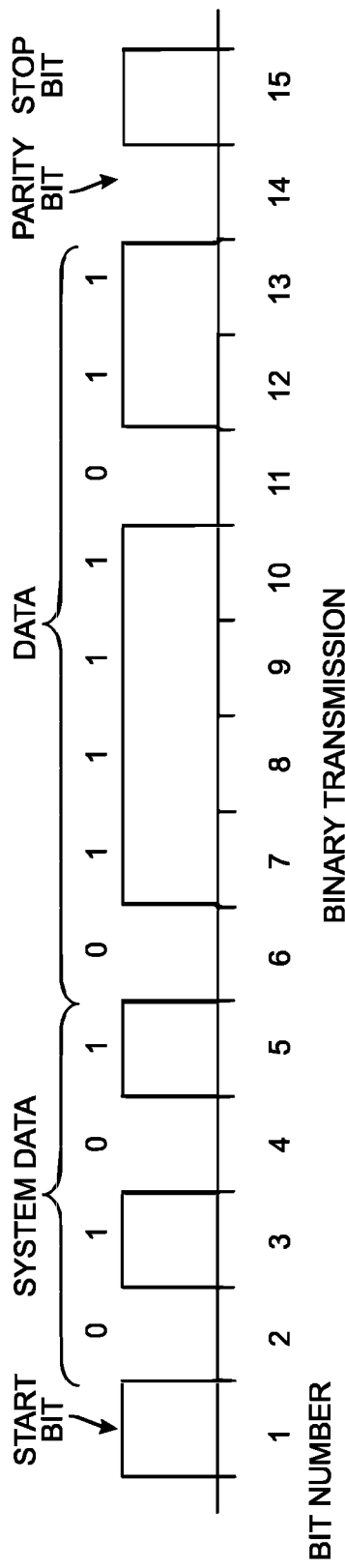
FIG. 3 illustrates an operational signal using binary transmission.

Codeset identifier 33 is transmitted and received as part of a wireless communication between remote control device 2 and receiver 12. In the presently illustrated example, infrared signals are transmitted from remote control device 2 and received by receiver 12. Various protocols may be used in transmitting the infrared signals. FIG. 3 illustrates an infrared signal using binary transmission. In the example of FIG. 3, the data (codeset identifier 33) is a sequence of bits 01111011 {equivalent to decimal 123) and is transmitted in the infrared signal as a stream of digital values in binary transmission format.

Figure 4:
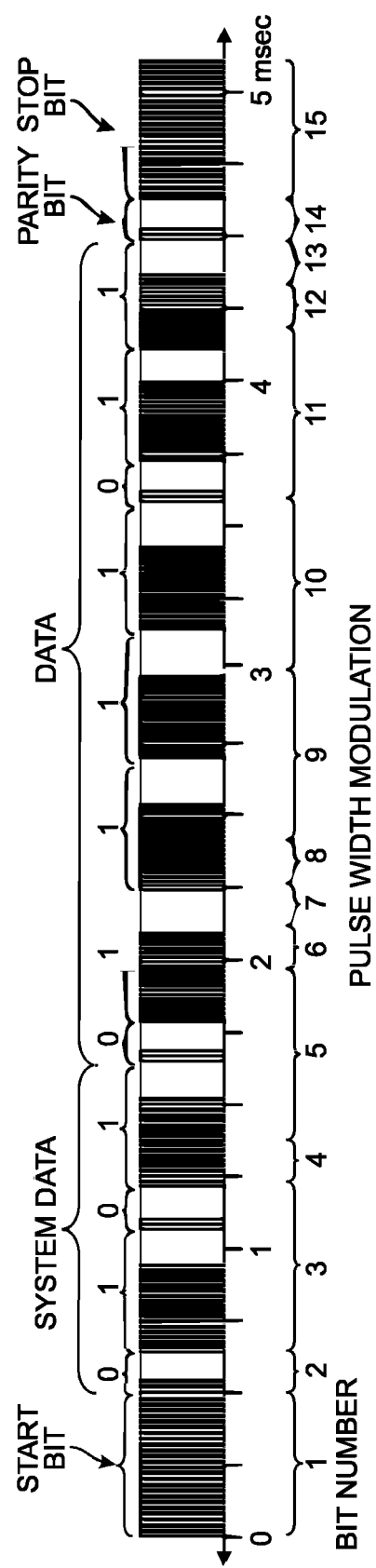
FIG. 4 illustrates an operational signal using pulse width modulation.

FIG. 4 illustrates an infrared signal using pulse width modulation. In the example of FIG. 4, the data (codeset identifier 33) is modulated onto the infrared signal using pulse width modulation. Digital ones and zeros are characterized by pairs of marks and spaces. A digital zero has a shorter duration of mark time than a digital one.

Although remote control discovery information 11 includes a codeset identifier in the previously described example, remote control discovery information 11 may also include various other types of information such as device information, diagnostic information, and/or marketing information. In one example, remote control discovery information 11 includes the device information of the electronic consumer device (for instance, TV 3) controlled by remote control device 2. The device information further comprises information such as a device description and device characteristics information. The device description contains information such as a brand name, a model number, and a device type that describe the electronic consumer device. For instance, the device description may be a text message of "Toshiba TV 42L×177" that describes an electronic consumer device that is a plasma TV with model number 42L×177 manufactured by Toshiba. Device characteristics information includes operational behavior of the electronic consumer device such as whether the device requires "ENTER" key after DIGIT entry for channel selection, and/or how long it will take from receiving POWER signal to the completion of power on process. Similar to codeset identifier 33, the device description can also be displayed on a display screen to enable a user to discover what type of electronic consumer device is controlled by remote control device 2.

In another example, remote control discovery information 11 includes diagnostic information and marketing information. The diagnostic information contains information of remote control device 2 such as how much battery charges are left in remote control device 2 and what is the status of remote control device 2. Diagnostic information is therefore useful in assisting a user to diagnose any potential problems of remote control device 2. The marketing information contains information of remote control device 2 such as usage and viewing habit of remote control device 2 used by a particular user. By transmitting the marketing information to online central database 7, useful information can be gathered and used in marketing and advertising activities.

Figure 5:
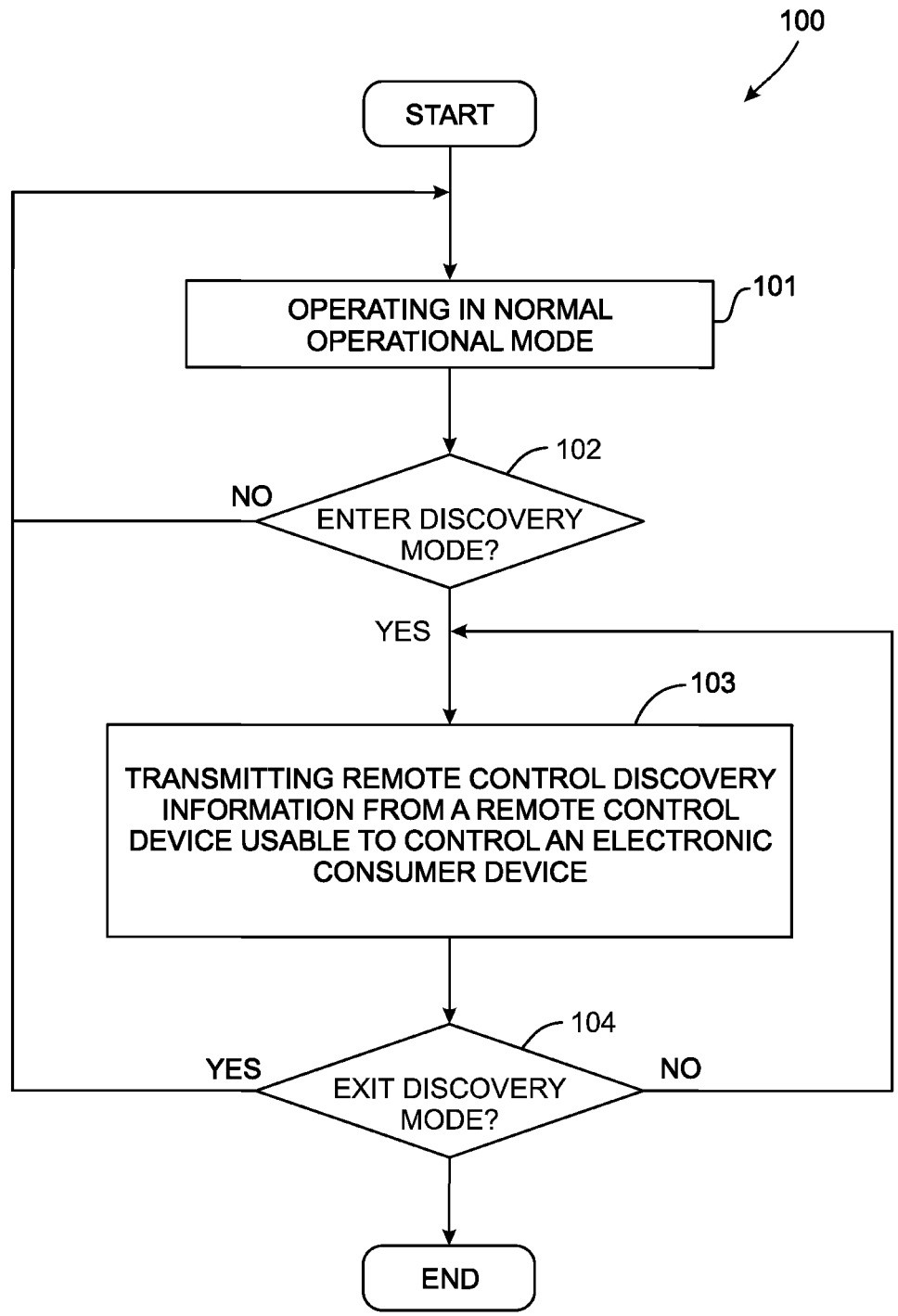
FIG. 5 is a flowchart of a method for transmitting remote control discovery information from a remote control device in accordance with one novel aspect.

FIG. 5 is a flowchart of a method 100 for transmitting remote control discovery information from a remote control device in accordance with one novel aspect. As illustrated in FIG. 5, the remote control device typically operates in the normal operational mode (step 101) to control a particular electronic consumer device (for instance, TV 3). When a user presses a predefined sequence of keys (for instance, MENU key plus ENTER key together) on the remote control device (step 102), the remote control device enters the discovery mode. In the discovery mode, the remote control device transmits the remote control discovery information (step 103). As illustrated above, the remote control discovery information may include a codeset identifier, device information, diagnostic information, and/or marketing information. In one example, each type of the remote control discovery information is associated with a specific key on the remote control device. For instance, if the user presses a numeric key "1", then the remote control device transmits a codeset identifier (for instance, a three digit number 123) stored in the remote control device. If the user presses a numeric key "2", then the remote control device transmits device information (for instance, text message "Toshiba TV 42L×177") associated with the electronic consumer device controlled by the remote control device. Finally, if the user presses another predefined sequence of keys (for instance, MENO key plus EXIT key together) on the remote control device (step 104) then the remote control device exits the discovery mode and returns back to its normal operational mode.

In the above described embodiment of FIG. 5, the remote control device enters a discovery mode in order to transmit the remote control discovery information. In another embodiment, however, the remote control device may not need to have the discovery mode for the purpose of transmitting the remote control discovery information. For example, the remote control device may transmit the remote control discovery information whenever it receives a particular key press or a signal without entering into the discovery mode. Alternatively, the remote control device may transmit the remote control discovery information periodically under a predetermined time interval (for instance, every 10 minutes).

For additional information on codesets, the generation of operational signals, universal remote control devices, their uses and related topics, see: U.S. patent application Ser. No. 10/737,129, filed Dec. 16, 2003, by Daniel SauFu Mui, entitled "Relaying Key Code Signals through a Remote Control Device"; U.S. patent application Ser. No. 10/777,023, filed Feb. 10, 2004, by Lee et al., entitled Interactive Web-Based Codeset Selection And Development Tool"; U.S. patent application Ser. No. 10/928,808, filed Aug. 27, 2004, by Provis et al., entitled "An 8-Bit Register-Based Virtual Machine" (the subject matter of these documents is incorporated herein by reference).

Although certain specific exemplary embodiments are described above in order to illustrate the invention, the invention is not limited to the specific embodiments. For example, remote control device 2 could be a universal remote control device that is capable of transmitting the remote control discovery information. Remote control device 2 could also be a radio frequency (RF) remote control device instead of an infrared (IR) remote control device. Receiver 12 could be a standalone device such as a universal infrared receiver (OIR), a DVR, a DVD recorder, a PC, or any device that supports wireless capabilities. The remote control discovery information could be communicated from one remote control device to another remote control device. In addition, the codeset identifier could be in other format and is not limited to a three digit number as long as it uniquely identifies the corresponding electronic consumer device. Accordingly, various modifications, adaptations, and combinations of various features of the described embodiments can be practiced without departing from the scope of the invention as set forth in the claims.

What is claimed is:

1. A non-transitory, computer readable media having stored thereon instructions, the instructions, when executed by a remote control device, causing the remote control device to perform steps comprising:
   retrieving from a memory of the remote control device a codeset identifier that identifies to a command transmitting programming of the remote control device a codeset having a plurality of command codes that is to be used by the remote control device in a currently configured, normal operating mode of the remote control device to control functional operations of an intended target device; and
   transmitting the codeset identifier in a signal to a receiving device.

2. The non-transitory, computer readable media as recited in claim 1, wherein the receiving device comprises a set-top box device and the signal uses a protocol recognizable by the set-top box device.

3. The non-transitory, computer readable media as recited in claim 1, wherein the instructions further cause the remote control device to both retrieve from the memory the codeset identifier and to transmit the signal in response to a predetermined key entry code being provided to the remote control device.

4. The non-transitory, computer readable media as recited in claim 1, wherein the instructions further cause the remote control device to determine a condition of a battery installed within the remote control device and to transmit to the receiving device a further signal comprising a further data indicative of the condition of the battery.

5. The non-transitory, computer readable media as recited in claim 4, wherein the instructions further cause the remote control device to both determine the condition of the battery and to transmit the further signal in response to a predetermined key entry code being provided to the remote control device.

6. The non-transitory, computer readable media as recited in claim 5, wherein the receiving device comprises a set-top box device and the signal and the further signal both use a protocol recognizable by the set-top box device.

7. A system, comprising:
   a remote control device having a first processing device and a first memory storing first instructions executable by the first processing device; and
   a receiving device having a second processing device and a second memory storing second instructions executable by the second processing device;
   wherein the first instructions, when executed by the first processing device, cause the remote control device to retrieve from the first memory a codeset identifier that identifies to a command transmitting programming of the remote control device a codeset having a plurality of command codes that is to be used by the remote control device in a currently configured, normal operating mode of the remote control device to control functional operations of an intended target device, and transmit the codeset identifier in a signal to the receiving device; and
   wherein the second instructions, when executed by the second processing device, cause the receiving device to use the signal when received from the remote control device to cause a display of information representative of the codeset identifier retrieved from the first memory.

8. The system as recited in claim 7, wherein the receiving device comprises a set-top box device and the signal uses a protocol recognizable by the set-top box device.

9. The system as recited in claim 7, wherein the first instructions further cause the remote control device to both retrieve from the first memory the codeset identifier and to transmit the signal in response to a predetermined key entry code being provided to the remote control device.

10. The system as recited in claim 7, wherein the first instructions further cause the remote control device to determine a condition of a battery installed within the remote control device and to transmit to the receiving device a further signal comprising a further data indicative of the condition of the battery.

11. The system as recited in claim 10, wherein the first instructions further cause the remote control device to both determine the condition of the battery and to transmit the further signal in response to a predetermined key entry code being provided to the remote control device.

12. The system as recited in claim 11, wherein the receiving device comprises a set-top box device and the signal and the further signal both use a protocol recognizable by the set-top box device.

13. The system as recited in claim 7, wherein the second instructions cause the receiving device to use the signal when received from the remote control device to cause a display of information representative of a brand for the intended target device.

14. The system as recited in claim 13, wherein the second instructions cause the receiving device to use the signal when received from the remote control device to cause a display of information representative of a model for the intended target device.

* * * * *